US008117278B2

(12) United States Patent
Maes (10) Patent No.: US 8,117,278 B2
(45) Date of Patent: Feb. 14, 2012

(54) ORCHESTRATION OF COMPONENTS TO REALIZE A CONTENT OR SERVICE DELIVERY SUITE (75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 559 days.

(21) Appl. No.: 11/671,127

(22) Filed: Feb. 5, 2007

(65) Prior Publication Data
US 2008/0189401 A1 Aug. 7, 2008

(51) Int. Cl.
G06F 15/173 (2006.01)
(52) U.S. Cl. ........ 709/217; 709/203; 709/223; 709/225; 709/229; 709/246; 709/218; 709/219; 709/230; 709/231; 709/247
(58) Field of Classification Search .......... 709/223, 709/225, 217, 218, 219, 230, 231, 232, 246, 709/247
See application file for complete search history.

(56) References Cited

U.S. PATENT DOCUMENTS

| | | | | |
|---|---|---|---|---|
| 5,341,477 A * | 8/1994 | Pitkin et al. | ................... | 709/226 |
| 5,850,517 A | 12/1998 | Verkler et al. | | |
| 6,157,941 A | 12/2000 | Verkler et al. | | |
| 6,374,305 B1 | 4/2002 | Gupta et al. | | |
| 7,155,715 B1 * | 12/2006 | Cui et al. | ...................... | 717/177 |
| 7,594,256 B2 * | 9/2009 | Bhat et al. | ......................... | 726/1 |
| 7,617,521 B2 | 11/2009 | Maes | | |
| 7,774,323 B2 * | 8/2010 | Helfman | ....................... | 707/694 |
| 7,783,635 B2 | 8/2010 | Maes | | |
| 2001/0026553 A1 * | 10/2001 | Gallant et al. | ................ | 370/395 |
| 2002/0087674 A1 | 7/2002 | Guilford et al. | | |
| 2002/0091819 A1 * | 7/2002 | Melchione et al. | ........... | 709/224 |
| 2002/0178122 A1 | 11/2002 | Maes | | |
| 2002/0184373 A1 | 12/2002 | Maes | | |
| 2002/0194388 A1 | 12/2002 | Boloker et al. | | |
| 2002/0198719 A1 | 12/2002 | Gergic et al. | | |
| 2002/0198991 A1 | 12/2002 | Gopalakrishnan et al. | | |
| 2003/0005034 A1 * | 1/2003 | Amin | ............................. | 709/202 |
| 2003/0023953 A1 | 1/2003 | Lucassen et al. | | |
| 2003/0046316 A1 | 3/2003 | Gergic et al. | | |

(Continued)

OTHER PUBLICATIONS

Andrews, Tony et al.; Business Process Execution Language for Web Services, Version 1.1.; BEA Systems, International Business Machines Corporation, Microsoft Corporation, SAP AG, Siebel Systems, May 5, 2003, 31 pages.

(Continued)

Primary Examiner — John Follansbee
Assistant Examiner — Anthony Mejia
(74) Attorney, Agent, or Firm — Kilpatrick Townsend & Stockton LLP (57) ABSTRACT Methods, systems, and machine-readable media are disclosed for orchestrating behavior of network resources to provide a content and/or service delivery suite. According to one embodiment, orchestrating behavior of network resources to provide a content and/or service delivery suite can comprise detecting an access of the content or service delivery suite. Orchestration can be applied to the one or more network resources based on the access of the content or service delivery suite. At least one workflow on at least one of the one or more network resources can be executed based on the orchestration. For example, the at least one workflow can comprise a workflow for performing content aggregation, a workflow for performing management of content, a workflow for performing management of a service, a workflow for performing delivery of content or a service, etc.

37 Claims, 5 Drawing Sheets

U.S. PATENT DOCUMENTS

| | | | |
|---|---|---|---|
| 2005/0015340 A1 | 1/2005 | Maes | |
| 2005/0027871 A1* | 2/2005 | Bradley et al. | 709/227 |
| 2005/0049924 A1* | 3/2005 | DeBettencourt et al. | 705/21 |
| 2005/0060372 A1* | 3/2005 | DeBettencourt et al. | 709/206 |
| 2005/0251527 A1* | 11/2005 | Phillips et al. | 707/101 |
| 2006/0010195 A1* | 1/2006 | Mamou et al. | 709/203 |
| 2006/0143686 A1 | 6/2006 | Maes | |
| 2006/0178893 A1* | 8/2006 | McCallie et al. | 705/1 |
| 2006/0212574 A1 | 9/2006 | Maes | |
| 2006/0259603 A1* | 11/2006 | Shrader et al. | 709/223 |
| 2006/0271488 A1 | 11/2006 | Maes | |
| 2006/0271600 A1* | 11/2006 | Goh et al. | 707/201 |
| 2006/0272028 A1 | 11/2006 | Maes | |
| 2007/0027975 A1* | 2/2007 | Tai et al. | 709/223 |
| 2007/0036145 A1* | 2/2007 | Riley et al. | 370/352 |
| 2007/0061397 A1* | 3/2007 | Gregorat et al. | 709/203 |
| 2007/0067452 A1* | 3/2007 | Fung et al. | 709/224 |
| 2007/0106808 A1* | 5/2007 | Vemula et al. | 709/230 |
| 2007/0130336 A1* | 6/2007 | Hietala et al. | 709/225 |
| 2007/0203841 A1 | 8/2007 | Maes | |
| 2007/0204017 A1 | 8/2007 | Maes | |
| 2007/0226775 A1* | 9/2007 | Andreasen et al. | 726/1 |
| 2007/0233851 A1* | 10/2007 | Ma | 709/224 |
| 2009/0094453 A1* | 4/2009 | Bradley et al. | 713/153 |

OTHER PUBLICATIONS

Liberty Architecture Overview, Liberty Alliance Project Version 1.1, Piscataway New Jersey, Jan. 15, 2003, 44 pages.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Parlay APIs 4.0, Parlay X Web Services White Paper, The Parley Group: Parlay X Working Group, Dec. 16, 2002, 12 pages.

Policy-Based Management Tom Sheldon's Linktionary, downloaded http://www.lintionary.com/p/policy.html on Aug. 2, 2004, 4 pages.

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

* cited by examiner

ORCHESTRATION OF COMPONENTS TO REALIZE A CONTENT OR SERVICE DELIVERY SUITE

CROSS-REFERENCE TO RELATED APPLICATIONS

This application is also related to the following commonly-owned, co-pending applications (the "Related Applications"), of which the entire disclosure of each is incorporated herein by reference, as if set forth in full in this document, for all purposes:

U.S. patent application Ser. No. 11/138,844, filed May 25, 2005, by Maes and entitled "Platform and Service for Management and Multi-Channel Delivery of Multi-Types of Contents"; U.S. patent application Ser. No. 11/137,969, filed May 25, 2005, by Maes and entitled "Personalization and Recommendations of Aggregated Data Not Owned by the Aggregator"; U.S. patent application Ser. No. 11/138,546, filed May 25, 2005, by Maes and entitled "Techniques for Analyzing Commands During Streaming Media to Confirm Delivery"; U.S. patent application Ser. No. 11/123,471, filed Jun. 16, 2005, by Maes and entitled "Charging Via Policy Enforcement"; U.S. patent application Ser. No. 11/357,653, filed Feb. 16, 2006, by Maes and entitled "Factorization of Concerns to Build a SDP (Service Delivery Platform)"; and U.S. patent application Ser. No. 11/357,652, filed Feb. 16, 2006, by Maes and entitled "Service Level Digital Rights Support in a Multi-Content Aggregation and Delivery System".

BACKGROUND OF THE INVENTION

Embodiments of the present invention generally relate to electronic communications in a network. More specifically, embodiments of the present invention relate to orchestrating behavior of network resources to provide a content and/or service delivery suite.

Content and/or services can be delivered through a growing number of channels. Traditionally, content, such as videos, movies, etc., were delivered through wireline systems, such as cable. With the advent of next generation telecommunication networks, such as 3G, this content may be delivered to mobile devices. Accordingly, for example, video and data, may be sent to users using their mobile devices, such as cellular phones, personal digital assistants, etc.

The wireless and wireline systems that delivered the content are typically different. For example, telecommunication operators typically use different platforms to deploy systems that allow mobile download of content than systems used to provide content through wireline networks. Accordingly, content management and delivery is difficult when combining delivery across both wireline and wireless networks. There is redundancy at integration points due to various network elements and resources, difficulty in cross selling due to disparate content management systems, inflexibility in supporting new content types for the future, and difficulty in extending or customizing the functionality to add new capabilities. The potential for generating new revenue streams by providing content across wireless systems is great. However, the mobile space includes many devices that communicate through many different channels. Accordingly, it is difficult to provide content to all the devices communicating through all the channels.

Various approaches to delivering content and/or services via various channels have involved using platforms consisting of a number of dedicated components for communicating via these channels and performing particular tasks related to delivery and/or management of the content or services. However, such approaches are limited in the interactions between components and the flexibility or extensibility of the platform as implemented. Hence, there is a need in the art for improved methods and systems for providing a content and/or service delivery suite.

BRIEF SUMMARY OF THE INVENTION

Methods, systems, and machine-readable media are disclosed for orchestrating behavior of network resources to provide a content and/or service delivery suite. According to one embodiment, a method for orchestrating behavior of network resources to provide a content and/or service delivery suite can comprise detecting an access of the content or service delivery suite. The access of the content or service delivery suite can comprise an upload of content, a download of content, a request for a service, etc.

Orchestration can be applied to the one or more network resources based on the access of the content or service delivery suite. Applying orchestration to the one or more resources can comprise performing one or more processes based on the access of the content or service delivery suite. The one or more processes can be defined, for example, in Business Process Execution Language (BPEL).

At least one workflow on at least one of the one or more network resources can be executed based on the orchestration. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

According to another embodiment, a system can comprise a communications network and a plurality of network resources communicatively coupled with the communications network. The plurality of network resources can be adapted to execute at least one workflow to provide a content or service delivery suite. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

The system can also include a policy enforcer communicatively coupled with the communications network and adapted to detect an access of the content of service delivery suite and apply orchestration to the at least one workflow based on the access of the content or service delivery suite. The access of the content or service delivery suite comprises an upload of content, a download of content, a request for a service, etc. Applying orchestration to the one or more resources can comprise performing one or more processes based on the access of the content or service delivery suite. For example, the one or more processes can be defined in Business Process Execution Language (BPEL).

According to yet another embodiment, a machine-readable medium can have stored thereon a series of instructions which, when executed by a processor, cause the processor to provide a content or service delivery suite by detecting an access of the content or service delivery suite. The access of the content or service delivery suite can comprise an upload of content, a download of content, a request for a service, etc.

Orchestration can be applied to the one or more network resources based on the access of the content or service delivery suite. Applying orchestration to the one or more resources can comprise performing one or more processes based on the access of the content or service delivery suite. The one or more processes can be defined, for example, in Business Process Execution Language (BPEL).

At least one workflow on at least one of the one or more network resources can be executed based on the orchestration. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Generally speaking, embodiments of the present invention relate to orchestrating behavior of network resources to provide a content and/or service delivery suite. Embodiments of the present invention provide for executing a number of workflows on network resources for performing various individual tasks related to the content and/or service delivery suite. According to one embodiment, these workflows can be provided and/or performed by any of a number of "off-the-self" or other components or systems such as those described in the Related Application cited above. The behavior of these various network resources and the execution of the individual workflows can further be orchestrated by a policy enforcer to overall functionality and control of the content and/or service delivery suite. In this way, flexibility and/or extensibility of the suite can be enhanced.

Stated another way, according to one embodiment, orchestrating behavior of network resources to provide a content and/or service delivery suite can comprise detecting an access of the content or service delivery suite. It should be noted that, as used herein, the phrase access of the content is used to refer to various operations related to the content. For example, an access of the content can include a request to download or retrieve content but is not limited to such operations. In other cases, an access of the content can also include, but is not limited to, an upload of content or metadata by third party content provider, or management of content by an operator or third party, etc.

Orchestration can be applied to the one or more network resources based on the access of the content or service delivery suite. At least one workflow on at least one of the one or more network resources can be executed based on the orchestration. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

It should be noted that embodiments of the present invention may be implemented in any of a wide variety of networks used for different types of electronic communications. For example, while embodiments of the present invention may be useful in orchestrating components of a network used to provide telephone services, various other embodiments are not limited to implementations in such networks. In other examples, embodiments of the present invention may be implemented in a network that additionally or alternatively provides television and/or other multimedia services. It should also be noted that, while discussed herein with reference to Business Process Execution Language (BPEL), embodiments of the present invention may be implemented with other types of languages for defining processes and performing orchestration of components.

Figure 1:
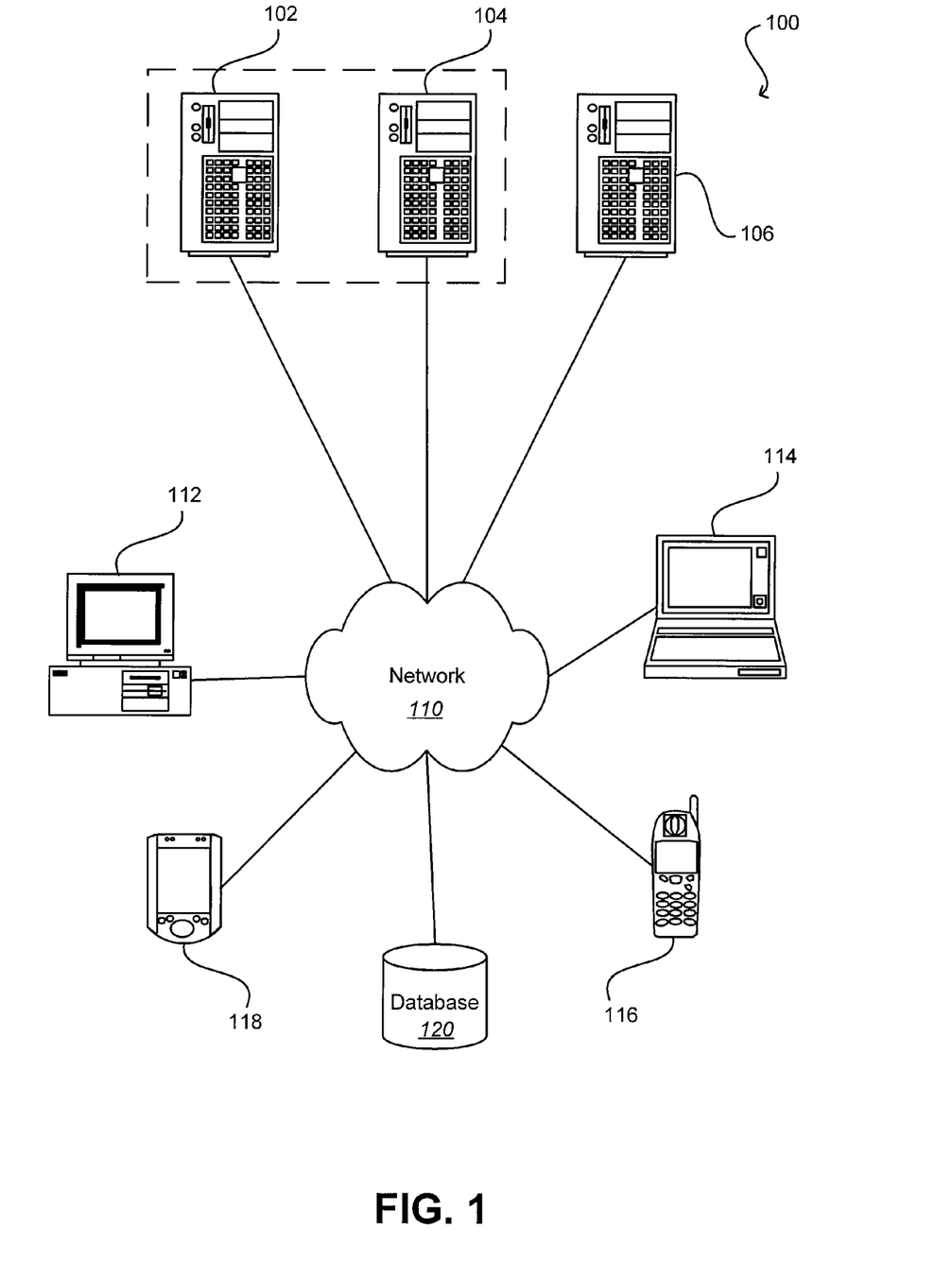
FIG. 1 is a block diagram illustrating an exemplary environment in which various embodiments of the present invention may be implemented.

FIG. 1 is a block diagram illustrating an exemplary environment in which various embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 110 described below) and/or displaying and navigating Web pages or other types of electronic documents. Although the exemplary system 100 is shown with four user computers, any number of user computers may be supported.

The system 100 can also include a communications network 110. The network may can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10 g, that is adapted to store, update, and retrieve data in response to SQL-formatted commands.

Figure 2:
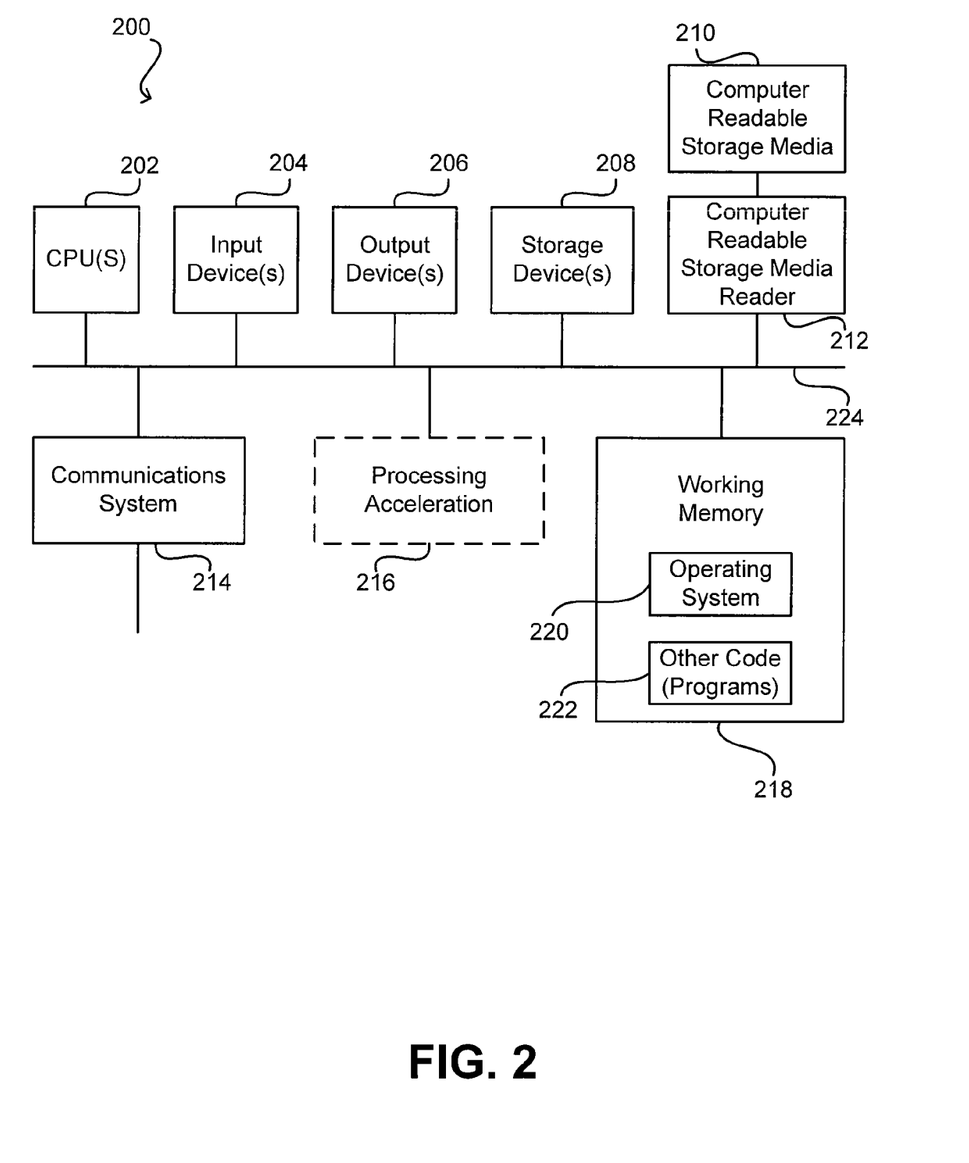
FIG. 2 is a block diagram illustrating an exemplary computer system upon which embodiments of the present invention may be implemented.

FIG. 2 is a block diagram illustrating an exemplary computer system upon which embodiments of the present invention may be implemented. The system 200 may be used to implement any of the computer systems described above. For example, one or more systems such as system 200 may be used to implement a server, user computer, and/or any other of the systems or components described above.

The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 (e.g., a modem, a network card (wireless or wired), an infra-red communication device, etc.), and working memory 218, which may include RAM and ROM devices as described above. In some embodiments, the computer system 200 may also include a processing acceleration unit 216, which can include a digital signal processor DSP, a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing computer-readable information. The communications system 214 may permit data to be exchanged with the network and/or any other computer described above with respect to the system 200.

The computer system 200 may also comprise software elements, shown as being currently located within a working memory 218, including an operating system 220 and/or other code 222, such as an application program (which may be a client application, Web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer. Based on the disclosure and teachings provided herein, a person of ordinary skill in the art will appreciate other ways and/or methods to implement the various embodiments.

Software stored on and/or executed by system 200 can include instructions for orchestrating behavior of network resources to provide a content and/or service delivery suite. As noted above and as will be described further below, embodiments of the present invention provide for orchestrating behavior of network resources to provide a content and/or service delivery suite. Embodiments of the present invention provide for executing a number of workflows on network resources for performing various individual tasks related to the content and/or service delivery suite. According to one embodiment, these workflows can be provided and/or performed by any of a number of "off-the-self" or other components or systems such as those described in the Related Application cited above. The behavior of these various network resources and the execution of the individual workflows can further be orchestrated by a policy enforcer to overall functionality and control of the content and/or service delivery suite. In this way, flexibility and/or extensibility of the suite can be enhanced.

Stated another way, according to one embodiment, orchestrating behavior of network resources to provide a content and/or service delivery suite can comprise detecting an access of the content or service delivery suite. Orchestration can be applied to the one or more network resources based on the access of the content or service delivery suite. At least one workflow on at least one of the one or more network resources can be executed based on the orchestration. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

Figure 3:
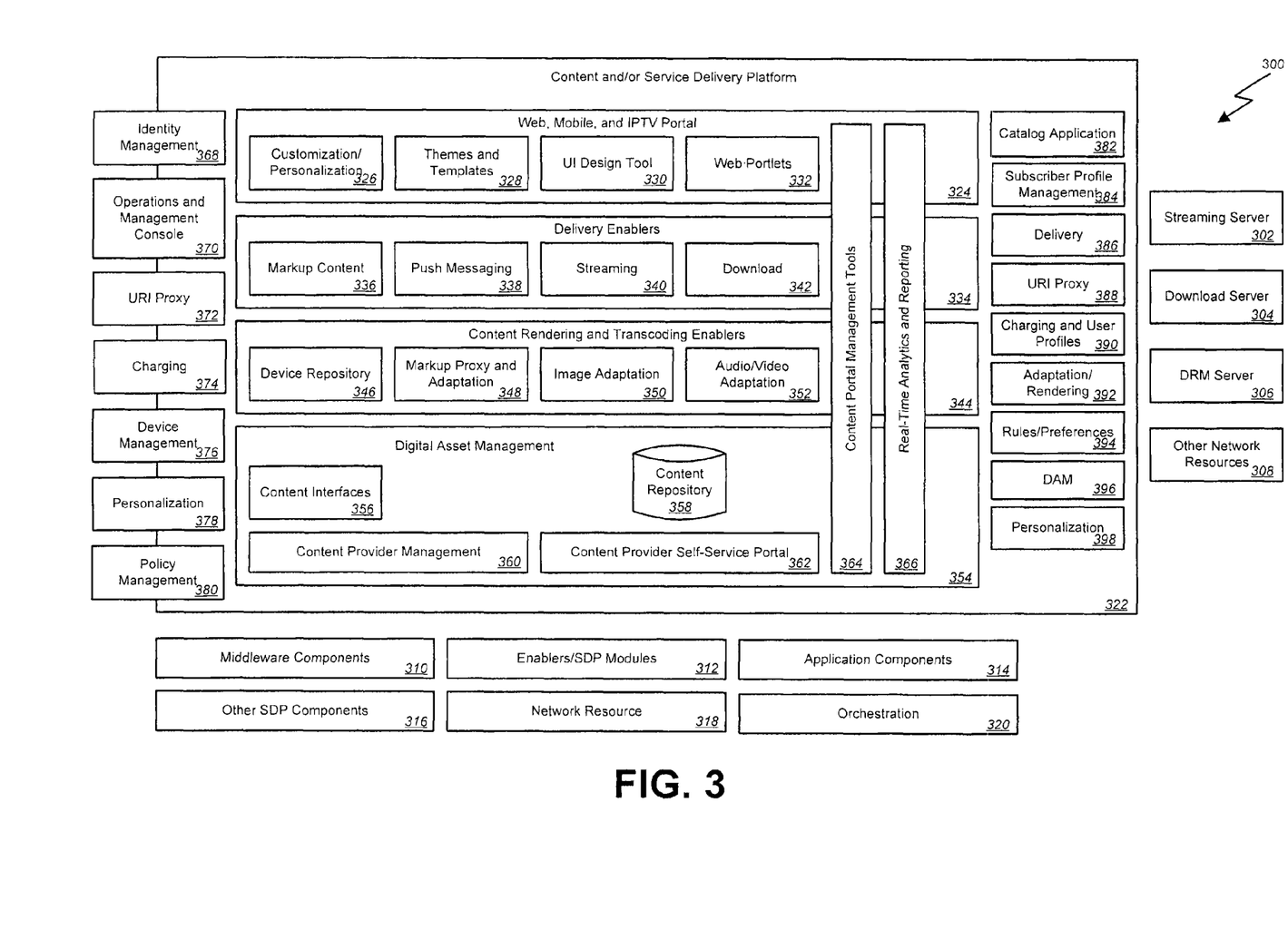
FIG. 3 is a block diagram illustrating functional components of a system for orchestrating behavior of network resources to provide a content and/or service delivery suite according to one embodiment of the present invention.

FIG. 3 is a block diagram illustrating functional components of a system for orchestrating behavior of network resources to provide a content and/or service delivery suite according to one embodiment of the present invention. In this example, the system 300 includes a content and/or service delivery platform 322. Generally speaking, the content and/or service delivery platform 322 can represent a platform such as described, for example, in the Related Applications entitled "Platform and Service for Management and Multi-Channel Delivery of Multi-Types of Contents," "Factorization of Concerns to Build a SDP (Service Delivery Platform)" and others cited above. As such, the content and/or service delivery platform 322 represents an aggregation of these disclosures and can provide for delivery of content and/or services via a number of different channels as described in the Related Applications.

In summary, the content and/or service delivery platform 322 can include a number of different layers such as a portal layer 324, enabler layers 334 and 344, and a digital asset management layer 354. The portal layer 324 can be adapted to receive messages from various devices or endpoints through one or more channels. For example, the portal can include modules for providing customization/personalization 326, themes and/or templates 328, a UI design tool 330, web portlets 332, and/or others. The enabler layers 334 and 344 can include delivery enablers 334 for providing content such as markup content 336, push messaging 338, streaming content 340, downloads 342, etc and content rendering and transcoding enablers 344 that can include a device repository 346, a markup proxy 348, image adaptation 350, audio/video adaptation 352, etc. The digital asset management layer 354 can include a content repository 358, content interfaces 356, a content provider management module 360, and a content provider self-service portal 362. The digital asset management layer 354 can provide for management and control of access to digital assets, such as the content of the content repository 358 as described, for example, in the Related Application entitled "Service Level Digital Rights Support in a Multi-Content Aggregation and Delivery System" cited above.

The content and/or service delivery platform 322 can also include a number of other modules and/or components. For example, the content and/or service delivery platform 322 can include content portal management tools 364 and/or a real-time analytics and reporting module 366 that spans or operates across the various layers 324, 334, 344, and 354 of the platform 322. The content and/or service delivery platform 322 can include a number of modules or processes providing management tools including, but not limited to, identity management 368, an operations and management console 370 or interface, a URI proxy 372, charging 374, device management 376, personalization 378, and policy management 380. The content and/or service delivery platform 322 can also include a number of modules or processes providing, controlling, or related to access to or rendering of content or services by users or other elements of the system 300. For example, these modules can include, but are not limited to a catalog application 382, a subscriber profile management module 384, a delivery module 386, a URI proxy 388, a charging and user profile module. 390, an adaptation or rendering module 392, a rules or preferences module 394, a Digital Asset Management (DAM) module 396, a personalization module 398, etc. According to one embodiment, the content and/or service delivery suite can be adapted, for example via the management tools 368, 370, 372, 374, 376, 378, and 380 and/or the content portal management tools 364 to allow an operator or administrator of the content and/or service delivery platform 322 to perform various management and/or administrative tasks related to the system. For example, the content and/or service delivery platform 322 can be adapted to allow an operator or administrator to manage content, subscriber accounts (i.e., accounts of subscribers to the service), content provider accounts (i.e., third-party providers of content available through the service), etc.

In addition to the content and/or service delivery platform 322, the system 300 can also include any of a number of servers that interact with or support the operations of the content and/or service delivery platform 322 including, but not limited to, a streaming server 302, a download server 304, a Digital Rights Management (DRM) server 306, as well as other network resources 308. The system 300 can also include a number of other modules or components that interact with or support the content and/or service delivery platform including, but not limited to, middleware components 310, various enablers or SDP modules 312, application components 314, other SDP components 316, and various network resources 318.

Additional details regarding the elements of the system 300, the content and/or service delivery platform 322, and the functionality provided by the various elements illustrated in FIG. 3 can be found in the Related Applications cited above. According to one embodiment, the system 300 illustrated in FIG. 3 can also include an orchestration component 320. Generally speaking, the modules and functions of the system 300 illustrated in FIG. 3 can be implemented as any number of discrete workflows for performing the various tasks as described here and in the Related Applications. Furthermore, when aggregated into a system 300 for providing a content and/or service delivery suite, can be orchestrated by an orchestration module 320 or policy enforcer that applies a set of policies to one or more of the workflows to control the operation of that workflow and/or the interactions between workflows. In this way, the various function and features described above and in the Related Applications can be integrated and aggregated to provide a content and/or service delivery suite while maintaining flexibility and extensibility.

Figure 4:
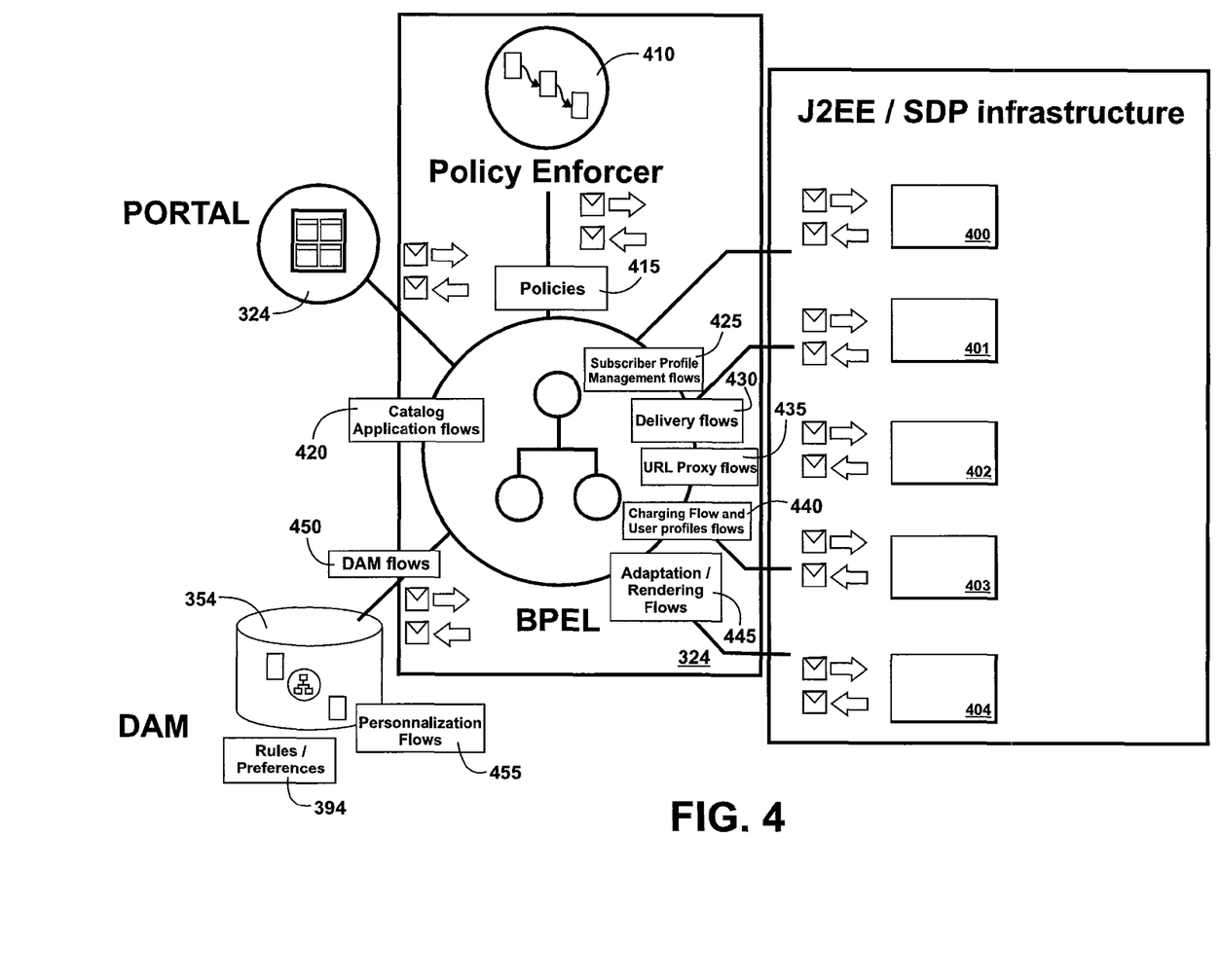
FIG. 4 is a block diagram conceptually illustrating flow of a process for orchestrating behavior of network resources to provide a content and/or service delivery suite according to one embodiment of the present invention.

FIG. 4 is a block diagram conceptually illustrating flow of a process for orchestrating behavior of network resources to provide a content and/or service delivery suite according to one embodiment of the present invention. This example includes an orchestration component 320, portal 324, and DAM layer 354 as discussed above with reference to FIG. 3. Also included is a J2EE/SDP infrastructure 405. Generally speaking, the J2EE/SDP infrastructure 405 can include any of a variety of endpoints 400-404 or devices for communicating with the content and/or service delivery suite.

The orchestration component 320 can include a policy enforcer 410 and a set of policies 415. For example the policies can be defined as a set of BPEL instructions 420 defining actions and/or interactions of and/or between the various workflows 420-455. As noted above, the workflows 420-455 can define the various functions of the content and/or service delivery platform. For example, the workflows can include, but are not limited to catalog application flows 420, subscriber profile management flows 425, delivery flows 430, URI proxy flows 435, charging flows and user profile flows 440, adaptation/rendering flows 445, DAM flows 450, personalization flows 455, etc.

Also as noted above, network resources can be adapted to execute the workflows 420-455 to provide a content or service delivery suite. The policy enforcer 410 can be adapted to detect an access of the content of service delivery suite and apply orchestration to the workflows 420-455 based on the access of the content or service delivery suite. The access of the content or service delivery suite comprises an upload of content, a download of content, a request for a service, etc. Applying orchestration to the one or more resources can comprise performing one or more processes based on the access of the content or service delivery suite as defined by the policies 415.

Figure 5:
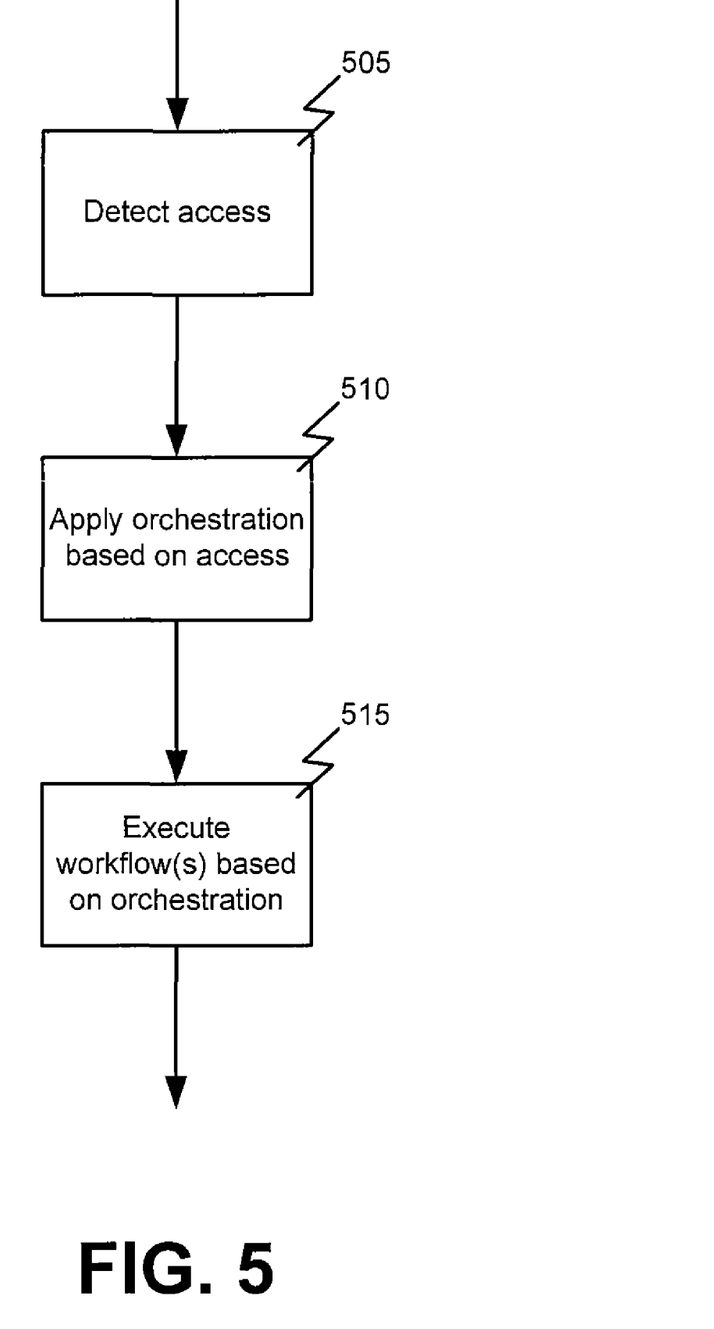
FIG. 5 is a flowchart illustrating a process for orchestrating behavior of network resources to provide a content and/or service delivery suite according to one embodiment of the present invention.

FIG. 5 is a flowchart illustrating a process for orchestrating behavior of network resources to provide a content and/or service delivery suite according to one embodiment of the present invention. In this example, processing begins with detecting 505 an access of the content or service delivery suite. As noted above, an access of the content can include a request to download or retrieve content but is not limited to such operations. In other cases, an access of the content can also include, but is not limited to, an upload of content or metadata associated with the content by third party content provider, or management of content by an operator or third party, etc. Therefore, the access of the content or service delivery suite can comprise an upload of content, a download of content, an upload of metadata associated with the content, management of the content, a request for a service, etc. The access can be performed by any of a variety of parties such as an end user, a third-party content provider, a provider of the content and/or service delivery suite, or other party.

Orchestration can be applied 510 to the one or more network resources based on the access of the content or service delivery suite. Applying 510 orchestration to the one or more resources can comprise performing one or more processes based on the access of the content or service delivery suite. The one or more processes can be defined, for example, in Business Process Execution Language (BPEL).

At least one workflow on at least one of the one or more network resources can be executed 515 based on the orchestration. For example, the at least one workflow can comprise a workflow for performing content aggregation. In another example, the at least one workflow can comprise a workflow for performing management of content. In yet another example, the at least one workflow can comprise a workflow for performing management of a service. In yet other example, the at least one workflow can comprise a workflow for performing delivery of content or a service.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for orchestrating behavior of a plurality of network resources to provide a content or service delivery suite, the method comprising:

executing with a computer system a Service Delivery Platform (SDP) and a policy enforcer, the SDP providing a content or services delivery suite;

detecting with the computer system an access of a content or service delivery suite by a client device of a plurality of client devices, wherein the content or service delivery suite provides content or services to the plurality of client devices across a plurality of different channels via the plurality of network resources, wherein the plurality of channels include two or more different networks, wherein each of the plurality of network resources executes at least one workflow defining a function of the content or service delivery suite;

applying orchestration across the plurality of channels with the policy enforcer of the computer system to the workflows of the plurality of network resources based on the access of the content or service delivery suite to provide the content or service delivery suite to the client using the plurality of network resources, wherein applying orchestration to the plurality of network resources comprises performing one or more processes based on the access of the content or service delivery suite and wherein the one or more processes define the content or service delivery suite and aggregate the functions defined by the workflows of the plurality of network resources; and executing with the computer system at least one workflow on at least one of the plurality of network resources based on the orchestration.

2. The method of claim 1, wherein the access of the content or service delivery suite comprises an upload of content.

3. The method of claim 1, wherein the access of the content or service delivery suite comprises an upload of metadata associated with the content.

4. The method of claim 3, wherein the upload of metadata associated with the content is performed by a third-party content provider.

5. The method of claim 1, wherein the access of the content or service delivery suite comprises management of content.

6. The method of claim 1, wherein the access of the content or service delivery suite comprises a download of content.

7. The method of claim 1, wherein the access of the content or service delivery suite comprises a request for a service.

8. The method of claim 1, wherein the one or more processes are defined in Business Process Execution Language (BPEL).

9. The method of claim 1, wherein the at least one workflow comprises a workflow for performing content aggregation.

10. The method of claim 1, wherein the at least one workflow comprises a workflow for performing management of content.

11. The method of claim 1, wherein the at least one workflow comprises a workflow for performing management of a service.

12. The method of claim 1, wherein the at least one workflow comprises a workflow for performing delivery of content.

13. The method of claim 1, wherein the at least one workflow comprises a workflow for performing delivery of a service.

14. A system comprising:
a plurality of communication channels including two or more different networks;
a plurality of client devices communicatively coupled with the plurality of communication channels;
a plurality of network resources, each of the plurality of network resources communicatively coupled with a different channel of the plurality of channels, wherein each of the plurality of network resources is adapted to execute at least one workflow defining functions of a content or service delivery suite; and
a server communicatively coupled with the plurality of communication channels and executing a Service Delivery Platform (SDP) providing the content or service delivery suite to each of the plurality of client devices, the server further executing a policy enforcer and adapted to detect an access of the content of service delivery suite and apply orchestration across the plurality of channels to the at least one workflow based on the access of the content or service delivery suite, wherein applying orchestration to the plurality of network resources comprises performing one or more processes based on the access of the content or service delivery suite, wherein the one or more processes define the content or service delivery suite and aggregate the functions defined by the workflows of the plurality of network resources, and wherein the network resources execute the at least one workflow based on the orchestration.

15. The system of claim 14, wherein the access of the content or service delivery suite comprises an upload of content.

16. The system of claim 14, wherein the access of the content or service delivery suite comprises a download of content.

17. The system of claim 14, wherein the access of the content or service delivery suite comprises a request for a service.

18. The system of claim 14, wherein the one or more processes are defined in Business Process Execution Language (BPEL).

19. The system of claim 14, wherein the at least one workflow comprises a workflow for performing content aggregation.

20. The system of claim 14, wherein the at least one workflow comprises a workflow for performing management of content.

21. The system of claim 14, wherein the at least one workflow comprises a workflow for performing management of a service.

22. The system of claim 14, wherein the at least one workflow comprises a workflow for performing delivery of content.

23. The system of claim 14, wherein the at least one workflow comprises a workflow for performing delivery of a service.

24. The system of claim 14, further comprising one or more management tools.

25. The system of claim 24, wherein the management tools are adapted to provide management of content of the content or service delivery suite.

26. The system of claim 24, wherein the management tools are adapted to provide management of content provider accounts of the content or service delivery suite.

27. The system of claim 24, wherein the management tools are adapted to provide management of subscriber accounts of the content or service delivery suite.

28. A computer-readable memory device having stored thereon a series of instructions which, when executed by a processor, cause the processor to provide content or services by:
executing a Service Delivery Platform (SDP) and a policy enforcer, the SDP providing a content or services delivery suite;
detecting an access of the content or service delivery suite by a client of a plurality of clients, wherein the content or service delivery suite provides content or services to the plurality of clients across a plurality of different channels via a plurality of network resources, wherein the plurality of channels include two or more different networks, wherein each of the plurality of network resources executes at least one workflow defining a function of a content or service delivery suite;
applying orchestration across the plurality of channels to the workflows of one or more of the plurality of network resources based on the access of the content or service delivery suite, wherein applying orchestration to the plurality of network resources comprises performing one or more processes based on the access of the content or service delivery suite and wherein the one or more processes define the content or service delivery suite and aggregate the functions defined by the workflows of the plurality of network resources; and
executing at least one workflow on at least one of the plurality of network resources based on the orchestration.

29. The computer-readable memory device of claim 28, wherein the access of the content or service delivery suite comprises an upload of content.

30. The computer-readable memory device of claim 28, wherein the access of the content or service delivery suite comprises a download of content.

31. The computer-readable memory device of claim 28, wherein the access of the content or service delivery suite comprises a request for a service.

32. The computer-readable memory device of claim 28, wherein the one or more processes are defined in Business Process Execution Language (BPEL).

33. The computer-readable memory device of claim 28, wherein the at least one workflow comprises a workflow for performing content aggregation.

34. The computer-readable memory device of claim 28, wherein the at least one workflow comprises a workflow for performing management of content.

35. The computer-readable memory device of claim 28, wherein the at least one workflow comprises a workflow for performing management of a service.

36. The computer-readable memory device of claim 28, wherein the at least one workflow comprises a workflow for performing delivery of content.

37. The computer-readable memory device of claim 28, wherein the at least one workflow comprises a workflow for performing delivery of a service.

* * * * *

UNITED STATES PATENT AND TRADEMARK OFFICE
CERTIFICATE OF CORRECTION

| | | |
|---|---|---|
| PATENT NO. | : 8,117,278 B2 | Page 1 of 1 |
| APPLICATION NO. | : 11/671127 | |
| DATED | : February 14, 2012 | |
| INVENTOR(S) | : Maes | |

It is certified that error appears in the above-identified patent and that said Letters Patent is hereby corrected as shown below:

On sheet 4 of 5, in figure 4, Box No. 455, line 1, delete "Personnalization" and insert -- Personalization --, therefor.

In column 9, line 2, delete "extensibility," and insert -- extensibility. --, therefor.

Signed and Sealed this
First Day of May, 2012

David J. Kappos
*Director of the United States Patent and Trademark Office*